United States Patent
Bouttier et al.

(10) Patent No.: US 12,207,213 B2
(45) Date of Patent: Jan. 21, 2025

(54) METHOD FOR SYNCHRONIZING SPECIFIC NODE CONNECTED TO PLURALITY OF OTHER NODE

(71) Applicant: MITSUBISHI ELECTRIC CORPORATION, Tokyo (JP)

(72) Inventors: Arnaud Bouttier, Rennes (FR); Nicolas Gresset, Rennes (FR); Adel Bechihi, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 395 days.

(21) Appl. No.: 17/636,104

(22) PCT Filed: Aug. 25, 2020

(86) PCT No.: PCT/JP2020/032795
§ 371 (c)(1),
(2) Date: Feb. 17, 2022

(87) PCT Pub. No.: WO2021/079618
PCT Pub. Date: Apr. 29, 2021

(65) Prior Publication Data
US 2022/0295435 A1   Sep. 15, 2022

(30) Foreign Application Priority Data

Oct. 23, 2019   (EP) ..................... 19306374

(51) Int. Cl.
*H04W 56/00*   (2009.01)
(52) U.S. Cl.
CPC ............... *H04W 56/0015* (2013.01)
(58) Field of Classification Search
None
See application file for complete search history.

(56) References Cited

U.S. PATENT DOCUMENTS

| 6,622,022 | B1 | 9/2003 | Du |
| 7,072,432 | B2 | 7/2006 | Belcea |

(Continued)

FOREIGN PATENT DOCUMENTS

JP   2011-199864 A   10/2011

OTHER PUBLICATIONS

International Search Report, issued in PCT/JP2020/032795, dated Dec. 23, 2020.

(Continued)

*Primary Examiner* — Phirin Sam
(74) *Attorney, Agent, or Firm* — Birch, Stewart, Kolasch & Birch, LLP

(57) ABSTRACT

Example implementations relate to a method for synchronizing a specific node connected to a plurality of other nodes. The method comprises receiving a respective synchronization quality value for a transmitting other node. The method also comprises measuring a respective propagation medium quality value with the transmitting other node. The method further comprises updating a specific synchronization reference of the specific node, whereby the updating comprises assigning to a respective contribution of the transmitting other node a respective weight of the transmitting other node, the respective weight being a function of the respective synchronization quality value of the transmitting other node and of the respective propagation medium quality value with the transmitting other node. The method also comprises revising a specific synchronization quality value and emitting to a receiving other node the revised specific synchronization quality value.

15 Claims, 5 Drawing Sheets

(56) References Cited

U.S. PATENT DOCUMENTS

| | | | |
|---|---|---|---|
| 9,686,055 B2 | 6/2017 | Khoryaev et al. | |
| 2008/0152046 A1 | 6/2008 | Armstrong et al. | |
| 2009/0196277 A1* | 8/2009 | Horn .................... | H04J 3/0679 |
| | | | 370/350 |
| 2014/0119390 A1* | 5/2014 | Rabinovich ........... | H04J 3/0638 |
| | | | 370/503 |
| 2020/0076687 A1* | 3/2020 | Comstock ......... | H04W 36/0094 |
| 2020/0092935 A1* | 3/2020 | Wang .................... | H04W 76/27 |
| 2020/0145977 A1* | 5/2020 | Kumar ................ | H04W 56/001 |
| 2020/0296783 A1* | 9/2020 | Su ....................... | H04W 76/14 |
| 2020/0337004 A1* | 10/2020 | Li .......................... | H04B 17/24 |
| 2021/0132895 A1* | 5/2021 | Cengarle ................ | G10L 25/06 |
| 2021/0190967 A1* | 6/2021 | Vollath .................... | G01S 19/41 |
| 2021/0243713 A1* | 8/2021 | Ellenbeck ........... | H04W 56/002 |
| 2021/0360551 A1* | 11/2021 | Kwak ................ | H04W 56/001 |
| 2022/0166556 A1* | 5/2022 | Lee ...................... | H04L 1/1825 |

OTHER PUBLICATIONS

Written Opinion of the International Searching Authority, issued in PCT/JP2020/032795, dated Dec. 23, 2020.
Japanese Office Action for Japanese Application No. 2022-532240, dated Mar. 14, 2023, with English translation.

* cited by examiner

METHOD FOR SYNCHRONIZING SPECIFIC NODE CONNECTED TO PLURALITY OF OTHER NODE

BACKGROUND ART

Various methods have been developed in order to synchronize a node to other nodes in a network. Such methods can for example rely on synchronizing a node with a reference, the objective of such methods being to minimize a drift from such reference. Such synchronization methods aim at avoiding miss alignment between various nodes in order to provide a more precise and reliable operation.

SUMMARY OF INVENTION

The invention is defined by the appended independent claims. Additional features and advantages of the concepts herein disclosed are set forth in the description which follows.

The present disclosure describes a method for synchronizing a specific node connected to a plurality of other nodes, the method comprising:

receiving, at the specific node and from a transmitting other node, a respective synchronization quality value for the transmitting other node, the respective synchronization quality value being a function of a respective synchronization characteristic of the transmitting other node;

measuring, by the specific node and for the transmitting other node, a respective propagation medium quality value with the transmitting other node; the respective propagation medium quality value being a function of a respective propagation characteristic between the specific node and the transmitting other node;

updating, by the specific node, a specific synchronization reference of the specific node, whereby the updating comprises, for the transmitting other node, assigning to a respective contribution of the transmitting other node a respective weight of the transmitting other node, the respective weight being a function of the respective synchronization quality value of the transmitting other node and of the respective propagation medium quality value with the transmitting other node, the respective contribution of the transmitting other node comprising a respective synchronization variable of the transmitting other node;

revising, by the specific node, a specific synchronization quality value being a function of the respective synchronization quality value of the transmitting other node and of the respective propagation medium quality value with the transmitting other node; and emitting, by the specific node, to a receiving other node, the revised specific synchronization quality value.

Taking both the respective synchronization quality value and the respective propagation medium quality value into account for the respective weight permits taking into account not only the quality of synchronization of the other node, but also the quality of the transmission or propagation between the transmitting node and the specific node. This permits taking into account that a transmitting node may be very well synchronized, but that such high quality of synchronization should be discounted if it is affected by the transmission between such a transmitting node and the specific node. On the other hand, another transmitting node having a slightly lesser synchronization quality and a significantly better transmission or propagation quality could be favored in the updating by being possibly assigned a relatively higher weight.

Optionally, the method further comprises using a rule to determine relative frequencies at which or order in which the specific node proceeds with the receiving, measuring, updating, revising and emitting. Using a rule may enable setting frequencies of execution of the different steps in function of the characteristics of different nodes. For example, a very well synchronized node may rarely revise its specific synchronization reference but may relatively frequently emit a revised specific synchronization value. On the other hand, a poorly synchronized node may relatively frequently update its specific synchronization reference but relatively rarely emit a revised specific synchronization quality value.

Optionally, the emitting takes place at a specific emitting power, the specific emitting power being determined in function of the specific synchronization quality value or in function of the revised specific synchronization quality value. This for example permits emitting at high power from a specific node if a specific node is relatively well synchronized, in order to favor a consensus synchronization and influence a higher number of other nodes.

Optionally, the respective synchronization characteristic is a respective synchronization statistic. The use of statistics could indeed avoid taking into account transient behaviors and potentially participate in converging towards a consensus synchronization while avoiding short term variations which may not be stable.

Optionally, the respective synchronization characteristic is a variance of a synchronization error. Proceeding in this manner would for example permit taking into account the synchronization precision of the corresponding transmitting node.

Optionally, the respective propagation characteristic is a respective propagation delay statistic. Taking this element into account may reduce uncertainty introduced through such delay, such uncertainty being potentially linked to the quality of the propagation through the propagation medium.

Optionally, the synchronization is a temporal synchronization, the specific synchronization reference being a clock. Synchronizing a clock would indeed allow different nodes to communicate significantly more precisely, thereby permitting precise operations which may be critical for example in the context of robots in a factory or of autonomous vehicles.

Optionally, the method is operating with a plurality of transmitting other nodes, each transmitting other node corresponding to a respective synchronization quality value, a respective synchronization characteristic, a respective propagation medium quality value, a respective propagation characteristic, a respective contribution, a respective weight and a respective miss synchronization variable. Extending the method to a plurality of transmitting nodes may permit reaching a consensus synchronization between such plurality of nodes.

Optionally, the updating comprises using Kalman filtering. Using such Kalman filtering would for example permit an increased precision in case of noise.

Optionally, the method is operating with a plurality of receiving other nodes. Such plurality of receiving other nodes would thereby benefit from the synchronization, and could in turn participate as transmitting other nodes also, further improving consensus synchronization.

The present disclosure also describes a specific node connected to a plurality of other nodes, the specific node comprising a processor adapted to perform according the methods described hereby.

Optionally, the specific node is a mobile specific node. Such mobile specific node is indeed likely to move from a cell to another, and may thereby particularly benefit from a method according to this disclosure which permits synchronization consensus.

Optionally, the transmitting other node is a mobile transmitting other node. Again, such mobile transmitting node is likely to move from a cell to another, and may thereby participate in permitting synchronization consensus in the context of mobility.

The present disclosure also describes a network comprising a plurality of specific nodes, at least some of the specific node being according to the specific nodes hereby described.

The present disclosure also describes a computer readable storage medium comprising instructions which, when executed by a processor, cause the processor to perform according to the methods described hereby.

DESCRIPTION OF EMBODIMENTS

Figure 1:
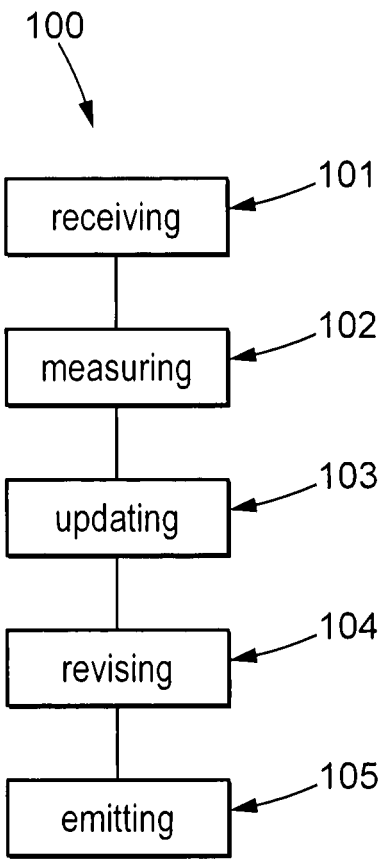
FIG. 1 is an example flow chart of a method.

Synchronization of nodes may take place in a number of different fields. A node should be understood as an entity which is configured to communicate with other entities. The various entities or nodes form a network in which the nodes are interconnected. A node may communicate using radio waves or using wired communication. A node may comprise a communication module such as a switch or router. Examples of nodes comprise telecommunication base stations, telecommunication mobile devices or terminals such as telephones, factory robots, satellites, drones or vehicles Synchronization should be understood as a process to align, between different nodes, a local variable characteristic, also named specific synchronization reference in this disclosure, the characteristic being local in the sense that it is specific to each node. Ideally, such local variable characteristic would be evolving exactly in a same manner at different nodes if a network would be perfectly synchronized. Examples of such local variable characteristic comprise a logical or virtual device based on a hardware based device. Examples include time setting device such as a clock, a frequency synthesizer, a measurement of speed of a node, for example from Doppler effect transmission, assuming that nodes move along a same direction, or a radio altimeter measuring a height from a node to the ground. In line with one such example, if connected nodes each comprise a clock, such nodes would be perfectly synchronized if their clock would indicate exactly the same time at a given instant. In another example, if connected nodes each comprise a frequency synthesizer, such nodes would be perfectly synchronized if their synthesizers operate at exactly the same frequency. In another example, if the nodes are drones and such nodes each comprise a radio altimeter, the radio altimeters will be perfectly synchronized if they indicate exactly the same value when the drones are at exactly the same distance from the ground. In another example, if the nodes are drones and such nodes move along inline on the same direction at respective speeds, the speeds will be perfectly synchronized if they indicate exactly the same value when the drones are moving at exactly the same speed. In all such example, the local variable characteristic which should be synchronized is transmitted through a medium which impacts its measurement.

Lack of synchronization or miss synchronization may take place in a network if and when devices specific to different nodes start to get misaligned compared to some reference or compared to one or more other nodes. Such misalignment may be characterized in a number of different manners. Such miss alignment may for example comprise an offset, a skew and/or a drift. Lack of synchronization may lead to issues such as miss communications in a communication network, collisions between connected vehicles, or manufacturing quality issues when using connected robots.

Each node may be associated with its own synchronization quality value, such synchronization quality value reflecting the tendency for a node to be well or not so well synchronized with other nodes or with some reference different from the specific synchronization reference. In some examples, the synchronization quality value may be a function of the offset, skew or drift compared to one or more other node, or a combination of these.

Each node may associate to another node with which it may be connected to a propagation medium quality value which reflects the quality of a communication medium between such two nodes. In some examples, such propagation medium quality value may be a propagation channel quality function of a propagation dispersion on the time for the information to be transmitted from one node to the other. In some examples, such propagation medium quality value may reveal variations of a physical characteristic in a medium impacting the measurement of an altitude from the ground or a speed of displacement, whereby such variations introduce an uncertainty on the altitude or speed measured. Communication through such medium may for example take place by radio communication or by optical or acoustic communication. The medium may for example be air or water.

The present disclosure aims at reducing miss synchronization at a specific node. This reduction of miss synchronization takes place by updating a specific synchronization reference of the specific node by taking into account information related to both the respective synchronization quality value and the respective propagation medium quality value in relation with an other node (respective meaning that they refer to the other node). Taking both the respective synchronization quality value and respective propagation medium quality value into account permits evaluating a level of trustworthiness of the other node concerned, meaning the likelihood that such other node should be taken into account as being well synchronized. It is important to take note of the fact that both the respective synchronization quality value and the respective propagation medium quality value are taken into account. Taking both into account ensures that a node is taken into account not only due to the quality of its own or intrinsic synchronization, but also due to the quality of the communication medium separating the other node and the specific node. This implies that a well synchronized other node which would not communicate well with the specific node may not be taken into account as much as an other well synchronized other node which would be better connected to the specific node. In other words, the method according to the invention provides an increased weight to an other node when synchronizing a specific node to other nodes if such other node is both better synchronized, and better connected to the specific node.

A example method 100 for synchronizing a specific node is illustrated in FIG. 1. The specific node may comprise a processor, a memory and a communication module. The communication module enables communication with a plurality of other nodes. The plurality of other nodes may comprise other nodes of a same nature as the specific node, for example when the specific node and the plurality of other nodes are vehicles. The plurality of other nodes may comprise a mix of other nodes of a same nature as the specific node and of other nodes of a nature different from the specific node, for example when the specific node and some other nodes are vehicles, while one or more other nodes comprise a base station. The nature of a node may for example be related to the fact that a node is mobile or stationary, or that it is wired to a network, communicates in a wireless manner, or is configured to both communicate wirelessly and in a wired manner. The plurality of other nodes may comprise 2 or more other nodes. In some examples, the plurality comprises between 10 and 20 nodes. In some examples, the plurality comprises more than 50 nodes.

The example method 100 comprises in block 101 receiving, at the specific node and from a transmitting other node, a respective synchronization quality value for the transmitting other node, the respective synchronization quality value being a function of a respective synchronization characteristic of the transmitting other node. The transmitting other node transmits information or data towards the specific node. Such transmitting may be direct or indirect. An indirect transmission may pass through other nodes or devices prior to reaching the specific node. The transmitting may take place along one single path or along several paths in parallel. The transmitting may be along a wireless path or a wired path, or along a path partly wireless and partly wired. The transmitting may be along a path comprising an optical communication segment. The transmitting may be along a path comprising an acoustic communication segment. The respective synchronization quality value represents a measure of the quality of synchronization of the transmitting other node. Such respective synchronization quality value of the transmitting other node is in some examples independent of the specific node and may be transmitted to other specific nodes. Such respective synchronization quality value may in some examples be higher when the synchronization quality is higher, for example if a respective weight as per the current disclosure is proportional to or increases together with a respective synchronization quality value. Such respective synchronization quality value may in some examples be lower when the synchronization quality is higher, for example if a respective weight as per the current disclosure is inversely proportional to or decreases when a respective synchronization quality value increases. The respective synchronization quality value is a function of a respective synchronization characteristic. Such a respective synchronization characteristic may for example correspond to a distance to a reference in a dimension of the synchronization, such dimension being for example temporal, height related, or speed related. In some examples, the respective synchronization characteristic is a respective synchronization statistic, the use of a statistic permitting to avoid considering a respective synchronization characteristic into account which would be accidental or transitory. In some examples, the respective synchronization characteristic is a variance of a synchronization error, whereby such a variance of a synchronization error may be representative of the quality of synchronization of a node over time.

The example method 100 comprises in block 102 measuring, by the specific node and for the transmitting other node, a respective propagation medium quality value with the transmitting other node; the respective propagation medium quality value being a function of a respective propagation characteristic between the specific node and the transmitting other node. The respective propagation medium quality value represents a measure of the quality of the communication medium between the transmitting other node and the specific node. For a given specific node, such respective propagation medium quality value may vary from one other transmitting node to another transmitting node, due to the fact that such respective propagation medium quality value is related to the medium concerned. Such respective synchronization quality value may in some examples be higher when the medium quality is high, meaning that the medium has little impact on measuring a respective contribution. Such respective propagation medium quality value may in some examples be lower when the medium quality is lower and impacts measuring the respective contribution. The respective propagation medium quality value is a function of a respective propagation characteristic between the specific node and the transmitting other node. Such a respective propagation characteristic may for example correspond to a traveling distance, traveling time, bandwidth, temperature, water salinity level, optical characteristics affecting for example laser transmission or to a number of intermediate communication devices or paths between the specific node and the transmitting other node. In some examples, the respective propagation characteristic is a respective propagation delay statistic, the use of a statistic permitting to avoid considering a respective propagation characteristic into account which would be accidental or transitory. In some examples, the synchronization is a temporal synchronization, the specific synchronization reference being a clock, the synchronization taking place along or in the time dimension.

The example method 100 comprises in block 103 updating, by the specific node, a specific synchronization reference of the specific node, whereby the updating comprises, for the transmitting other node, assigning to a respective contribution of the transmitting other node a respective weight of the transmitting other node, the respective weight being a function of the respective synchronization quality value of the transmitting other node and of the respective propagation medium quality value with the transmitting other node, the respective contribution of the transmitting other node comprising a respective synchronization variable of the transmitting other node. In an example, the respective weight is multiplied by the respective contribution. The updating according to this disclosure permits compensating for a miss alignment of a specific synchronization reference. The specific synchronization reference is specific to the specific node. In some examples, the specific node relies on such specific synchronization reference to provide a related value having a dimension such as a time, height, or speed. The synchronization reference may be a device or software implemented module such as a clock or radio altimeter. The updating is in some examples a calibration process, such calibration process relying on a respective contribution of the transmitting other node. The respective contribution is an information or data which indicates a synchronization variable from the transmitting other node, such variable having a dimension corresponding to the dimension being synchronized. The transmitting other node may for example provide as respective contribution a synchronization variable linked to a time, height or speed related to the transmitting other node which the specific node may rely on to calibrate along same dimension. Such respective contribution may be measured by the specific node. If for example the specific node and the transmitting other node are expected to transmit data at exactly a same instant, the updating may consider as respective contribution the instant at which the transmitting other node did transmit data, and get synchronized to such instant or respective contribution in relationship with the trustworthiness or reliability of the transmitting node, such trustworthiness or reliability being represented by assigning to the respective contribution of the transmitting other node a respective weight of the transmitting other node, the respective weight being a function of the respective synchronization quality value of the transmitting other node and of the respective propagation medium quality value. In some examples, the respective contribution may be measured, for example by measuring the respective contribution corresponding to the transmitting other node. An example of measuring a respective contribution is measuring that the transmitting other node is located at a precise height from the ground using a radio altimeter, or moves at a precise speed using a measurement of the Doppler effect, or emits a given time. Whether measured, perceived or otherwise, the respective contribution is likely to be subjected to error due to its transmission through a medium. The method according to this disclosure relies on synchronization quality and propagation medium quality to take such an error into account as part of the synchronization process, by assigning a weight to the respective contribution. If for example a transmitting node has a synchronization quality value corresponding to a high synchronization quality and a high respective propagation medium quality value corresponding to a high propagation medium quality, the respective contribution of this transmitting other node may be given a significantly high weight as a particularly trustworthy and reliable node as far as synchronization is concerned, from the point of view of the specific node. In some examples, the updating comprises using Kalman filtering. Kalman filtering comprises using linear quadratic estimation, for example on a series of respective contributions observed over time.

The example method 100 comprises in block 104 revising, by the specific node, a specific synchronization quality value being a function of the respective synchronization quality value of the transmitting other node and of the respective propagation medium quality value with the transmitting other node. Such specific synchronization quality value is a representation of how reliable the specific node is as far as synchronization is concerned. Such specific synchronization quality value is dependent on the respective synchronization quality value of the transmitting other node and on the respective propagation medium quality value with the transmitting other node because both the respective synchronization quality value of the transmitting other node and the respective propagation medium quality value with the transmitting other node were taken into account in the updating according to the block 103. In an example, if the specific other node is relatively badly connected to other nodes, the different respective propagation medium quality values with such other nodes will reflect a poor medium quality which will impact negatively on the specific synchronization quality value. In an example, if the specific other node is connected to other nodes, some of which having a poor respective synchronization quality, the different respective synchronization quality values of the other nodes having a poor respective synchronization quality will be taken into account through their respective weights, such respective weights minimizing an impact on the specific synchronization quality value from such other nodes having a poor respective synchronization quality.

The example method 100 comprises in block 105 emitting, by the specific node, to a receiving other node, the revised specific synchronization quality value. Such emitting would allow such a receiving node to operate as a specific node according to this disclosure. This emitting of the revised synchronization quality value allows different nodes to share their own specific synchronization quality value with other nodes, so that different nodes may synchronize by converging towards a same reference, such reference taking into account their respective weights as per the methods of the present disclosure.

The emitting may in some example also include, separately or concurrently with the emitting of the revised specific synchronization quality value, emitting other data.

In some examples, the method is operating with a plurality of receiving other nodes, whereby each of such receiving other nodes receive the revised specific synchronization quality value of the specific node, and may in turn use such revised specific synchronization quality value to get synchronized themselves, for example by operating at each receiving node a method according to this disclosure, considering each receiving node as a specific node. Such operation of a method according to this disclosure at different nodes may participate in reaching a consensus synchronization whereby a plurality of nodes would synchronize themselves.

Figure 2:
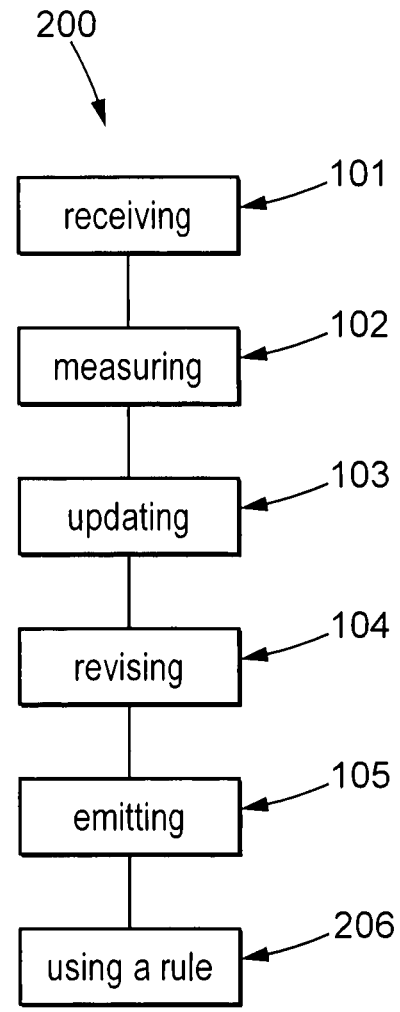
FIG. 2 is another example flow chart of a method.

FIG. 2 represents another method 200 according to this disclosure. Method 200 comprises blocks 101, 102, 103, 104 and 105 as described for method 100 of FIG. 1. In addition to the receiving 101, measuring 102, updating 103, revising 104 and emitting 105, method 200 comprises in block 206 using a rule to determine relative frequencies at which, or order in which, the specific node proceeds with the receiving, measuring, updating, revising and emitting. Such a rule may for example determine an order in which the specific node proceeds with the receiving 101, measuring 102, updating 103, revising 104 and emitting 105. Such receiving 101, measuring 102, updating 103, revising 104 and emitting 105 may indeed each take place at different frequencies and in a different order. In an example, the receiving, measuring, updating and revising will take place prior to the emitting. In an example, the receiving and measuring will take place at a frequency higher than the frequency at which the updating, revising and emitting will take place. In an example, the updating and revising will take place at a frequency higher than the frequency at which the emitting will take place. Such a rule may take one or more thresholds into account. In an example, the emitting will take place when the revised specific synchronization quality value differs from a former specific synchronization quality value by a threshold of more than 5%. Such an example rule may for example permit reducing communications between nodes by emitting a revised synchronization quality value only when a change to the synchronization quality value is considered significant. In another example rule, the receiving frequency is lowered if the specific synchronization quality value is above a certain threshold. Such an example rule may for example permit reducing communications by receiving only when the specific node is not considered as well synchronized. Such different rules may be combined in order to combine their effect. Such rule or combination of rules may comprise iterating a method according to this disclosure in order to converge towards a consensus synchronization.

In some examples the emitting, such as emitting 105, takes place at a specific emitting power, the specific emitting power being determined in function of the specific synchronization quality value or in function of the revised specific synchronization quality value. In some examples, the emitting power is increased if the synchronization quality is high or is above a certain threshold. Such a mode of operation would increase the emitting power of a reliable well synchronized node in a network, thereby increasing an overall operational quality.

In some example methods such as either one of method 100 or method 200, the method is operating with a plurality of transmitting other nodes, each transmitting other node corresponding to a respective synchronization quality value, a respective synchronization characteristic, a respective propagation medium quality value, a respective propagation characteristic, a respective contribution, a respective weight and a respective miss synchronization variable. Such operation with a plurality of transmitting other nodes may enable reaching a consensus synchronization, such consensus synchronization relying more heavily on particularly reliable nodes which are both well synchronized and well connected to other nodes, due to the fact that the respective weight of such particularly reliable nodes are a function of their respective synchronization quality value and respective propagation medium quality value. In an example, a normalized sum of each respective weight multiplied by each respective contribution is used for synchronization.

Figure 3:
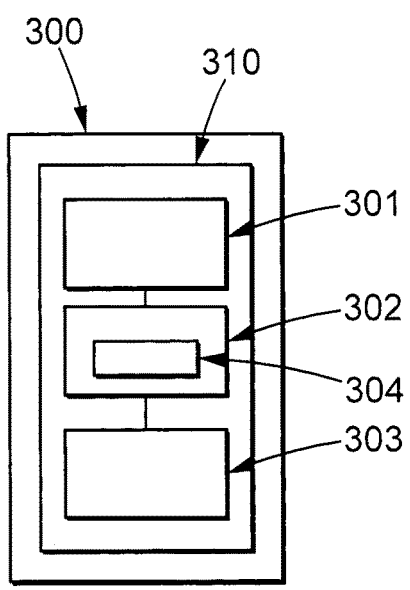
FIG. 3 is a diagram of an example node.

FIG. 3 illustrates an example node 300 according to this disclosure which comprises a node controller 310, the node controller 310 comprising a node processor 301 comprising electronic circuits for computation managed by an operating system, a node memory 302 comprising integrating circuits for storing information for use by a processor such as processor 301, and a node networking or communication device 303 for communication and interaction between devices or nodes on a network. The node 300 may be configured to operate as a specific node connected to a plurality of other nodes, the specific node comprising the processor 301 adapted to perform according to any of the methods according to this disclosure. Node 300 may be a telecommunication network node, a buoy, a drone or a vehicle, for example. Specific node 300 may indeed be a mobile specific node. The methods according to this disclosure are particularly well suited to operate with mobile nodes, including a mobile specific node, a mobile transmitting other node and a mobile receiving node, whereby such nodes reach a consensus synchronization independently of an absolute reference.

FIG. 3 also illustrates a non-transitory machine-readable or computer readable storage medium, such as, for example, node memory or storage unit 302, whereby the non-transitory machine-readable storage medium is encoded with instructions 304 executable by a processor such as processor 301, the machine-readable storage medium comprising instructions 304 to operate processor 301 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

Figure 4:
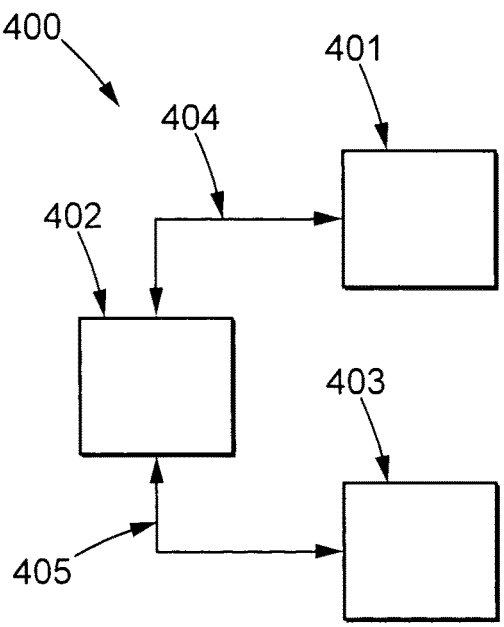
FIG. 4 is a diagram of an example network.

FIG. 4 illustrates an example network 400, whereby the network comprises specific node 402, transmitting other node 401 and receiving other node 403, as well as propagation channels 404 and 405 through a propagation medium, whereby either one of specific node 402, transmitting other node 401 and receiving other node 403 may be according to the node illustrated in FIG. 3, and whereby such specific node 402, transmitting other node 401 and receiving other node 403 are configured to operate according to the methods hereby disclosed. One should note that the transmitting other node 401 and receiving other node 403 may be, in some examples, a same node.

Figure 5:
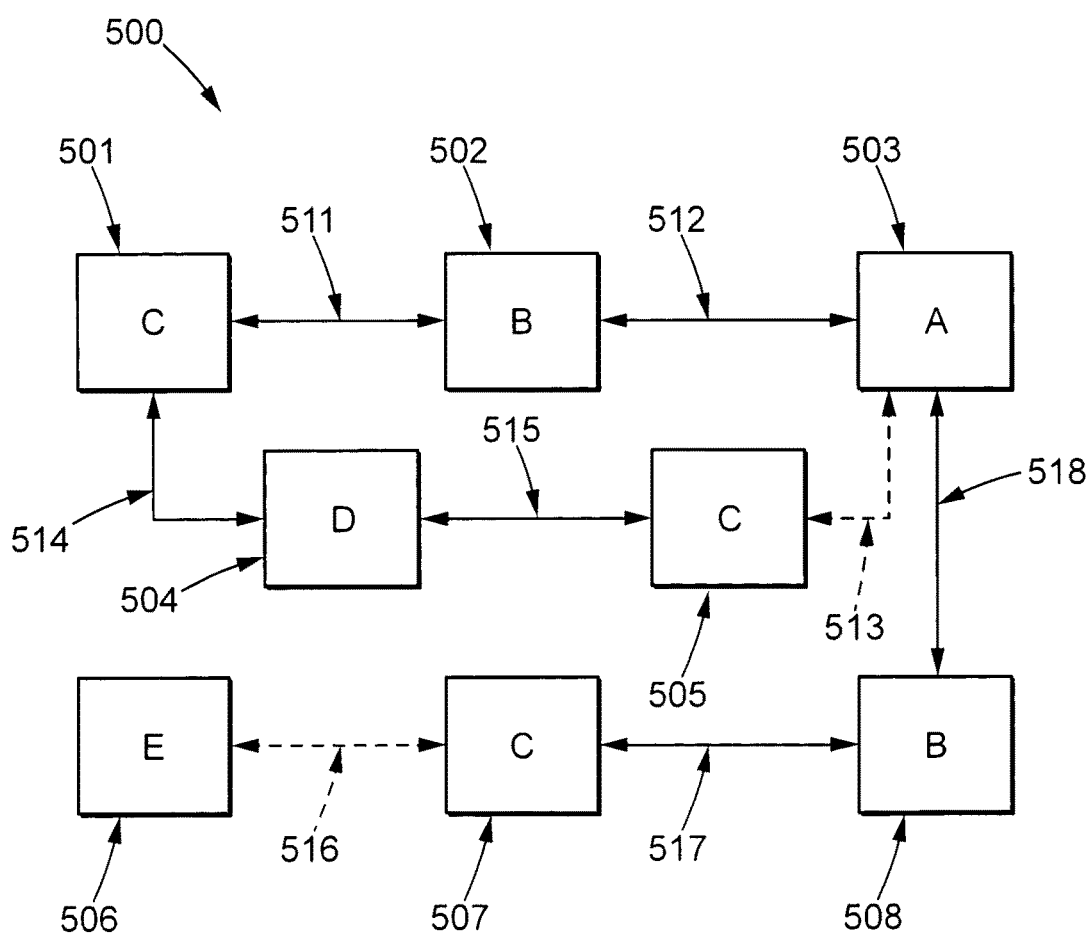
FIG. 5 illustrates another example network.

FIG. 5 illustrates another example network 500 comprising eight different nodes 501-508 communicating through communication or propagation channels 511-518 through a propagation medium. Each node may operate as a specific node as per the methods hereby described. Each of the nodes also may operate as a transmitting other node or as a receiving other node. Each node may be as per the node illustrated in FIG. 3. Each node has a synchronization quality value illustrated by a letter A-E in the center of each node. The synchronization quality values may be classified from best to worse in alphabetical order, "A" representing the best synchronization quality value, "E" representing the worse synchronization quality value. The node being best synchronized is node 503. The worse synchronized is node 506. Communications channels 511, 512, 514, 515, 517 and 518 in solid black have a high propagation medium quality, whereas communication channels 513 and 516 in dashed line have a low propagation medium quality. As illustrated here, node 506 has a low synchronization quality due to the fact that it is only connected to node 507, due to the fact that the propagation channel 516 with node 507 is through a medium of low quality, and due to the fact that the synchronization quality of node 507 is average. Node 503 has the best synchronization quality because it may communicate with a relatively high number of nodes, in this case the three nodes 502, 505 and 508, having a high quality propagation channel between some of such nodes 502 and 508, and a worse quality propagation channel with node 513. The fact that a node is connected to a high number of other nodes may increase its synchronization quality due to being more likely to reach a consensus synchronization state. While none of such nodes would be defined as a reference node in this example, node 503 would behave similarly to a reference node due to the operation of the methods according to this disclosure in the network of FIG. 5. While node 505 shares a low quality propagation channel 513 with node 503, and shares a high quality propagation channel 515 with node 504 having below average synchronization quality D, the node 505 still benefits from the high synchronization quality of node 503, thereby reaching a synchronization quality better than the synchronization quality of node 504.

In some examples, a node is particularly well synchronized, their synchronization quality value reflecting very high synchronization quality. Such a node would, when applying the method according to the invention, be given a related significant weight (assuming that the propagation medium quality remains acceptable), thereby operating similarly to a reference node, similarly for example to a reference base station.

Specific example implementation according to this disclosure will now be described. While these specific examples apply to telecommunication nodes and to temporal synchronization of such nodes, it should be understood that the underlying principles may be applied to dimensions other than time, and to nodes other than telecommunication nodes.

Some examples deal with time synchronization in mobile networks, i.e. situations where any kind of mobile entities, or nodes, are able to exchange information using wireless radio transmission. These nodes could for example be factory robots that should synchronize their movements to achieve collaborative tasks or to avoid collisions while moving. Another example could be vehicles (such as cars, trucks, buses, etc.), bicycles, or even pedestrians carrying a mobile communication device, or node, and sharing public road infrastructures to carry on their day-to-day activities. Vehicles may be equipped with communication capabilities. Vehicles may be able to communicate with infrastructure facilities such as dedicated road side units (RSU) or cellular base stations. Vehicles may communicate with each other directly without going through a centralized equipment. One example goal is to reduce the latency for sending emergency messages and to limit the radio interference by transmitting at low power. Vehicles may be configured to communicate when out-of-coverage from base stations. Vehicles may be enabled to communicate vehicle-to-vehicle (V2V) or vehicle-to-everything (V2X).

Interconnecting vehicles may be motivated by safety reasons. Cars may thereby be able to obtain a better understanding of their environment especially beyond the line of sight with the ability to warn for danger in their surroundings. Wireless connectivity may also enable autonomous driving, automated driving with low latencies, high throughputs and a high quality of service.

In wireless communication networks, time synchronization is relevant to consistent data traffic and also for accurate real-time control of message exchanges. Many network applications benefit from precise clock synchronization among nodes to ensure correctly ordered operations. Time synchronization is relevant to implementing time division multiple access (TDMA) scheduling algorithms. In addition to communication related matters, a precise time synchronization is also beneficial at an application level. For example, traffic management involves the vehicles to share road information such as vehicle dynamics, and driving intentions. The status of the nodes therefore should be determined precisely in terms of position, speed and other real-time values. Overall, time synchronization in vehicular networks may be used into two categories: a performance-oriented category and an application-oriented category.

Each node i in the network according to these specific examples is assumed to have an own local hardware clock that is used to build a logical clock $\tau_i(t)$ at the software level. An ideal clock can be modelled as $\tau_i(t)=t$ for all t, where t is the absolute, ideal or real time. In practice, node's clock may only be close to the ideal time. Dealing with hardware clocks, manufacturers of crystal oscillators specify a tolerance value ρ in parts per million (PPM) relative the nominal frequency at 25° C., which determines the maximum amount that a skew rate will deviate from unity, as follows:

$1-\rho \leq a_i \leq 1+\rho$

In an example, the skew rate is of the order of a few to 20 PPM. The clock may be modeled as following a linear model:

$\tau_i(t)=a_i t+b_i$ where $a_i$ is the local clock skew rate which determines the clock speed, and $b_i$ is a local clock offset. In fact, to maintain the continuity of the local clock, the nodes may derive a virtual compensated clock $C_i(t)$ using a linear function of its own local clock:

$C_i(t)=\alpha_i \tau_i(t)+\phi_i$

Here it is assumed that the skew rate is constant over time. In practice, skew rate may vary over time due to drifts introduced by aging effects and environmental factors such as temperature. However, drift resulting from aging may act much more slowly than an update rate or frequency of synchronization schemes, and thus may be ignored. Due to the continuous clock drifting and the error introduced by a message delivery time or propagation channel or propagation medium delay, it may not be possible to exactly synchronize the node clocks. A possible goal of this example synchronization method is thus to have the clocks closely synchronized. Each clock is a synchronization reference according to the current disclosure. Therefore, if the lag between clocks may be bounded by some specific constant δ, namely:

$|C_i(t)-C_j(t)|\leq \delta$, the two nodes are declared δ-synchronized. In the sequel the nodes will be described as synchronized. Synchronization thus may consist in ensuring that, at any time, the node clocks, also name synchronization references, may differ by at most δ from the ideal time, a specific node's clock, an arbitrary clock or a virtual consensus clock. This target clock will be described as the reference clock in the sequel. As a result, each node i may find both values $(\alpha_i,\phi_i)$ in order to converge its virtual compensated clock $C_i(t)$ to the reference $C_{ref}(t)$ which means that:

$$\lim C_i(t) = C_{ref}(t)$$

Synchronization algorithms may transmit a synchronization variable. One example consists in broadcasting physical layer beacons at regular time intervals according to an internal compensated clock. A receiving node searches for the beacon using signal detection algorithms for example based on correlation techniques. Once detected, the receiving node is able to deduce the time at which the beacon was received with respect to its internal clock.

In the present example, time synchronization applies to mobiles devices using wireless communications. This makes the synchronization more challenging. In fact, the mobility aspect can be the source of several issues that can heavily degrade the quality of service, especially regarding safety-oriented applications that benefit from low latency and permanent or semi-permanent connection availability. The mobility of the vehicles causes the regular change of base station the vehicle is connected to. A resynchronization step may take place at every cell change. Due to the potential impact of radio propagation impairments, the mobility of the nodes may negatively affect the number of successfully received packets and thus, promote extending the communication delay within the network. Another possible issue comes from the transmission delays that can be significantly larger for base stations-to-vehicles links than between vehicles.

This specific example deals with time synchronization in mobile networks. More specifically, we focus in this example on consensus-like distributed algorithms in order to avoid the impact of node failure and regular network topology reconstruction that affect centralized solutions. An objective of this synchronization method is to further improve the performance of the synchronization. The method appears to be resilient to network dynamics due to a lack of hierarchical organization. The method takes advantage of the potential difference between the nodes in terms of synchronization quality.

In some examples the method tends to favor some nodes depending on their level of connectivity (the weight being function of the propagation medium quality). Taking only this element into account may only provide a rough estimation of the synchronization based on the assumption that nodes well interconnected to many neighbors systematically benefit from better synchronization performance. Besides logical, this assumption is not necessarily true in all situations. One node might be connected to several nodes with a bad synchronization quality due to large skew rates, or to a single node but with a high synchronization precision. We hereby therefore explicitly take into account both the quality of the radio propagation link or propagation medium quality, and the synchronization quality of transmitting other nodes to compute their confidence values or synchronization quality values at the specific (or ego) node level. In case of a rich scattering, the link with some nodes might be affected by a large delay spread, thus degrading the quality of the synchronization.

The performance of the synchronization may indeed be influenced by the transmission rate of synchronization-related information. One may define a synchronization period according to performance requirements of the system. For some systems, nodes may transmit over each period or synchronization round. For other systems, nodes may transmit randomly, for example to reduce a waste of spectral resources but also to reduce an average level of interference. The exchange of synchronization packets may increase the traffic burden and may potentially impact other possibly safety related radio services. It might also be relevant to reduce the transmission rate of poorly synchronized nodes but also to increase the transmission rate during a convergence phase or reduce it when in steady state. Using a rule as per the current methods may take such elements into account.

This example proposes a distributed (peer-to-peer) clock synchronization method and more precisely a consensus-like synchronization method where all nodes tend to converge toward a common clock through the exchange of synchronization packets or beacons, method which reduces or avoids sensitivity to changing topologies and node failures.

The example method proposes to weight the contribution of each connected node in the consensus average with a confidence value, also named synchronization quality value, which reflects the synchronization performance of the transmitting node, and the quality of the propagation channel or propagation medium between the transmitting node and the ego node (the ego node being also named specific node). Each node may compute, or revise, in this example, its own synchronization quality and emits it to receiving other nodes. When in reception mode as receiving other nodes, the nodes combine the received respective synchronization quality values with the factor reflecting the quality of the propagation channel or propagation medium, also named propagation medium quality.

A specific implementation of this approach is obtained through the application of a Kalman filter. In addition, it is proposed to control the transmission rate of synchronization information by using a rule according to network and application-dependent criteria. An advantage of the proposed solution is the ability to introduce different priorities between the nodes depending on their performance, for example favoring or providing a higher weight to base stations.

In this example, the network is a half-duplex wireless network containing N User Equipment, UE, nodes and $N_r$ reference, Ref, nodes, for example base stations but any other node benefiting from a high quality clock may fall into this group. Half duplex should be understood as permitting communication in both directions, but not simultaneously, a node being either emitting or receiving at a given instant.

The network topology is represented by two graphs $\mathcal{G}$ and $\mathcal{G}_r$ for respectively the UE-to-UE and the Ref-to-UE networks. Let $A \in \mathcal{G}_{N \times N}$ and $A_r \in \mathcal{M}_{N \times N_r}$ be respectively the adjacency matrices $\mathcal{G}$ and $\mathcal{M}_r$. $A(k, j)=1$ if a communication link or propagation channel (in a propagation medium) exists from UE node (j) to UE node (k) (i.e. the k-th node is in the range of the j-th node), and $A(k, j)=0$ otherwise. $A_r(k, j)=1$ if a communication link or propagation channel exists from Ref node (j) to UE node (k), and $A_r(k, j)=0$ otherwise.

As explained above, in some synchronization techniques, nodes transmit specific packets that contain the time at which the packet was transmitted according to the node's local clock, this time being a specific synchronization reference value. The receiver can then use this knowledge combined with the time at which the packet has been received with respect to its local clock to update the synchronization. If the packets are transmitted randomly over time, it is more relevant to update the skew rate and offset of the linear model as all nodes update their clock at different times. The nodes may transmit both the skew and offset information over the air. In the present example, it is assumed that all nodes periodically broadcast (when in transmitting mode) a synchronization sequence (hereafter denoted as a beacon) generated according to their local clock information. There is thus no need to explicitly transmit any timing information such as a specific synchronization reference value. Ideally, all the nodes are due to broadcast their beacon exactly at the very same time. In practice, the clock used for generating the beacon for each node is updated as follows:

$$t_n^{(k)} = t_{n-1}^{(k)} + T^{(k)} \text{ with } T^{(k)} = T + \varepsilon^{(k)},$$

where $T^{(k)}$ is the clock period of the node (k) equal to the sum of the ideal period T and the clock skew $\varepsilon^{(k)}$ between two synchronization rounds. The clock skew is supposed constant here. Due to their drifting clocks, the nodes do not transmit at the same time. The purpose of the synchronization is thus to control their local clock so that all nodes transmit synchronously. The beacons are thus generated at the times given by their compensated clock:

$$\hat{t}_n^{(k)} = \hat{t}_{n-1}^{(k)} + T + \varepsilon^{(k)} + u_n,$$

where $u_n$ is the command for achieving the synchronization. Ideally, nodes should synchronize with respect to the ideal clock in which case the command compensates for the clock skew. In practice, the ideal clock is not known by the nodes in this example. The purpose of the synchronization is to ensure that all nodes transmit their beacon at the same time according to a common period $\hat{T}$ potentially different from the real one.

We assume in this example that the reference nodes benefit from a high quality clock. For that reason, they broadcast a beacon at each synchronization round n. Alternatively, a UE node randomly chooses to be in transmitting or receiving mode by using a rule according to the methods of this disclosure. In this example this choice is represented by a Bernoulli random variable $h_n^{(k)} \sim \mathcal{B}(p_n^{(k)}) : h_n^{(k)} = 1$ when the node (k) is transmitting its local compensated clock information, and $h_n^{(k)} = 0$ for the receiving mode (i.e. at step n the k-th node has probability $p_n^{(k)}$ to be transmitting). In a first step, we assume a rule implementing a transmitting probability of ½. When in receiving mode, the UE node updates its local clock value based on the received information in the aim of being synchronized with its neighbors and the Ref nodes.

This randomness affects the network topology and effective adjacency matrices at the n-th step are $\Omega_n = A \odot [(1_N - h_n) h_n^T]$ and $\Omega_{r_n} = A_r \odot [(1_N - h_n) 1_{N_r}^T]$, where $h_n$ is the transmitting indicator N-vector and $\odot$ is the element-wise matrix product. Note that $\Omega_n(k, j) = 1$ only if the k-th node is in receiving mode, the j-th is in transmitting mode and a communication link exists from (j) to (k).

When in transmitting mode, the UEs broadcast a synchronization sequence at time $\hat{t}_n^{(k)}$ updated according to their local period:

$$\hat{t}_n^{(k)} = \hat{t}_{n-1}^{(k)} + T + \varepsilon^{(k)}$$

When in receiving mode, the k-th node receives a superimposition of the synchronization sequences from the transmitting neighboring nodes (neighboring node meaning other node according to the methods of this disclosure), and may estimate a miss-synchronization with each node by using e.g. correlation-based detection techniques. The node may then update its clock according to the equation EQ1:

$$t_n^{(k)} = t_{n-1}^{(k)} + T + \varepsilon^{(k)} + \xi \sum_{j=1}^{N} \Omega_n^{(k,j)} \Delta_n^{(k,j)} + \xi \sum_{j=1}^{N_r} \Omega_{r_n}^{(k,j)} \Delta_{r_n}^{(k,j)},$$

where $\xi$ is a parameter for insuring the stability of the consensus algorithm and:

$$\begin{cases} \Delta_n^{(k)} = \begin{pmatrix} \Delta_n^{(k,1)} \\ \vdots \\ \Delta_n^{(k,k-1)} \\ 0 \\ \Delta_n^{(k,k+1)} \\ \vdots \\ \Delta_n^{(k,N)} \end{pmatrix} = \begin{pmatrix} (t_{n-1}^{(1)} + \varepsilon^{(1)} - t_{n-1}^{(k)} - \varepsilon^{(k)} + \tau^{(1,k)}) \\ \vdots \\ (t_{n-1}^{(k-1)} + \varepsilon^{(k-1)} - t_{n-1}^{(k)} - \varepsilon^{(k)} + \tau^{(k-1,k)}) \\ 0 \\ (t_{n-1}^{(k+1)} + \varepsilon^{(k+1)} - t_{n-1}^{(k)} - \varepsilon^{(k)} + \tau^{(k+1,k)}) \\ \vdots \\ (t_{n-1}^{(N)} + \varepsilon^{(N)} - t_{n-1}^{(k)} - \varepsilon^{(k)} + \tau^{(N,k)}) \end{pmatrix} \\ \Delta_{k_n}^{(k)} = \begin{pmatrix} \Delta_{r_n}^{(k,1)} \\ \vdots \\ \Delta_{r_n}^{(k,N_r)} \end{pmatrix} = \begin{pmatrix} (t_{r_{n-1}}^{(1)} + \varepsilon_r^{(1)} - t_{n-1}^{(k)} - \varepsilon^{(k)} + \tau_r^{(1,k)}) \\ \vdots \\ (t_{r_{n-1}}^{(N_r)} + \varepsilon_r^{(N_r)} - t_{n-1}^{(k)} - \varepsilon^{(k)} + \tau_r^{(N_r,k)}) \end{pmatrix} \end{cases}$$

Figure 6:
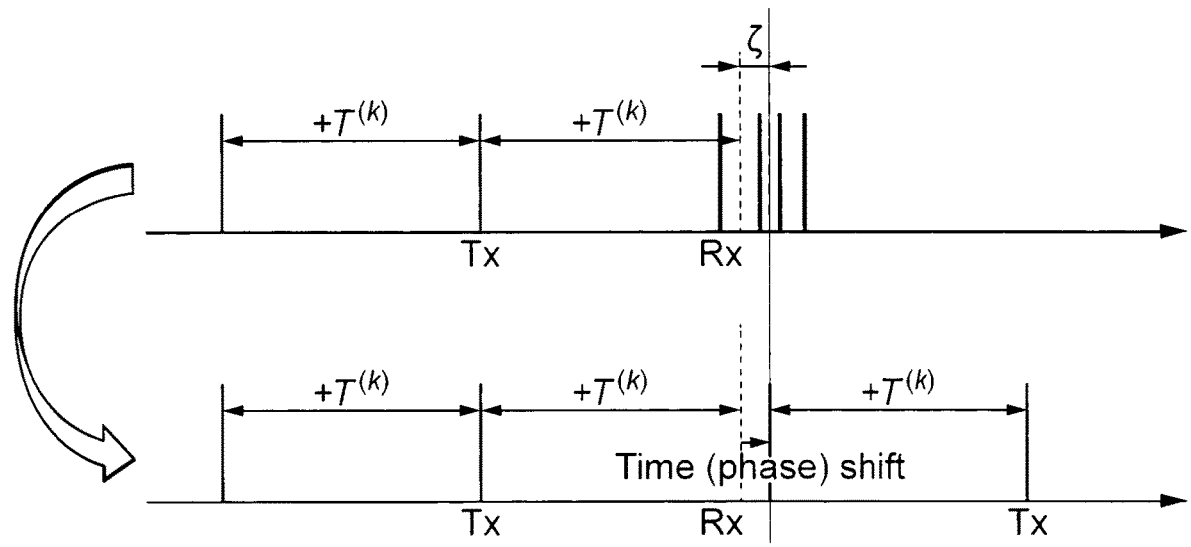
FIG. 6 illustrates a synchronization by consensus example

When in transmitting mode, the nodes transmit its beacon $T^{(k)}$ second after the previous time. When in receiving mode, a node uses the average of the time error between all the received beacons and the position of its own beacon if it was transmitting in order to shift the phase of its clock (See FIG. 6). It is important to notice that the timing differences are shifted by the propagation delays that are not known by the receiver.

To simplify the problem, we assume the existence of an absolute reference clock $t_n^{(0)} = t_{n-1}^{(0)} + T$ and we make the variable change:

$$x_n^{(k)} = t_n^{(k)} - t_n^{(0)}$$

Figure 7:
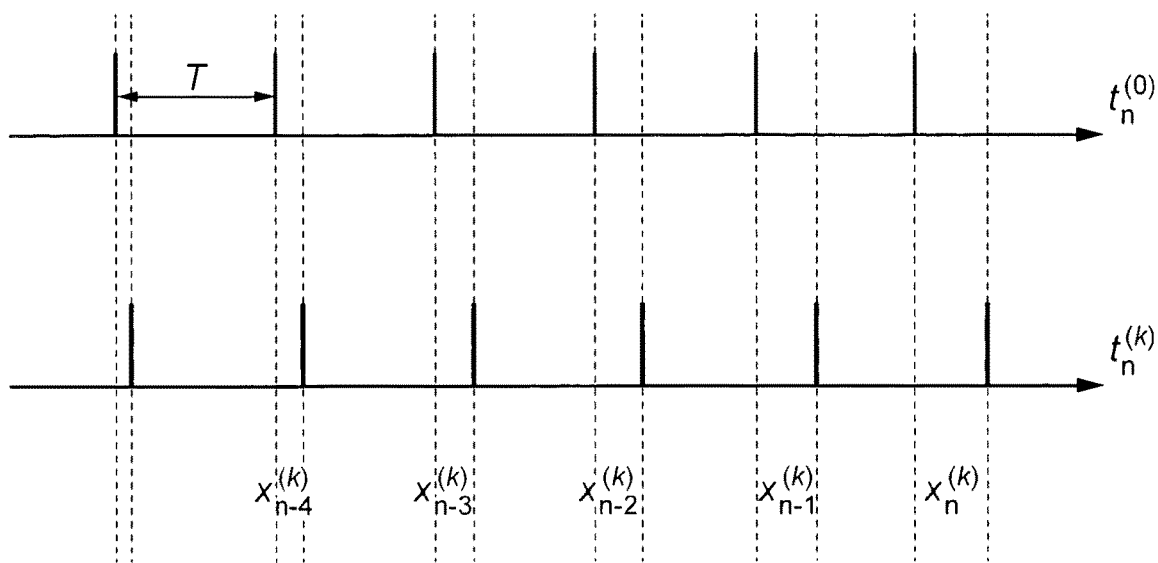
FIG. 7 illustrates a synchronization error example.

The variable $x_n^{(k)}$ represents the synchronization error, hereafter called miss-synchronization, of the node (k) with respect to the reference clock at the n-th step (or synchronization round). We note that the previous system can also describe both UE nodes and Ref nodes dynamics. A Ref node can be treated as a high quality (i. e. $\varepsilon^{(k)} \ll 1$) "UE" node that is always transmitting (i. e. $h_n^{(k)} \sim \mathcal{B}(1)$) which is equivalent to having always all-zeros observation vectors. The previous equation EQ1 is simplified as follows:

$$\hat{x}_{n+1}^{(k)} = x_n^{(k)} + \varepsilon^{(k)} + \xi \sum_{j=1}^{M} \Omega_n^{(k,j)} \Delta_n^{(k,j)}, \text{ where:}$$

$$\Delta_n^{(k)} = \begin{pmatrix} \Delta_n^{(k,1)} \\ \vdots \\ \Delta_n^{(k,M)} \end{pmatrix} = \begin{pmatrix} (\hat{x}_n^{(1)} + \varepsilon^{(1)} - \hat{x}_n^{(k)} - \varepsilon^{(k)} + \tau^{(1,k)}) \\ \vdots \\ (\hat{x}_n^{(M)} + \varepsilon^{(M)} - \hat{x}_n^{(k)} - \varepsilon^{(k)} + \tau^{(M,k)}) \end{pmatrix},$$

and $M = N + N_r$ is the overall number of nodes. In this system, the observation vectors are merged together and both UE nodes and Ref nodes are treated similarly as a "simple" nodes. It may be shown that the algorithm converges towards an equilibrium state that corresponds to a reference clock with skew rate and offset depending on the nodes' own parameters and propagation delays (see FIG. 7).

It may be noticed that the reference to the ideal clock disappears as the difference between the synchronization errors is also equal to the difference between the clocks:

$$\hat{x}_n^{(i)} - \hat{x}_n^{(k)} = \hat{t}_n^{(i)} - \hat{t}_n^{(k)},$$

a value that can be measured from the received beacons. The method can thus be executed without knowledge of the ideal clock.

In this example each node computes and transmits an explicit measure of its synchronization quality to serve as a weighting factor or weight $\beta_n^{(j)}$. The updating equation is given by:

$$\hat{x}_{n+1}^{(k)} = \hat{x}_n^{(k)} + \varepsilon^{(k)} + \sum_{j=1}^{M} \Omega_n^{(k,j)} \beta_n^{(j)} \Delta_n^{(k,j)}, \text{ where:}$$

$$\beta_n^{(j)} = \text{function} \left( \text{statistics}\{\hat{x}_n^{(j)}\} \right),$$

and where, in this example, the factor $\xi$ is merged to the weights $\beta_n^{(j)}$.

A statistical metric (or statistics) can be selected as the variance of the synchronization error:

$$\beta_n^{(j)} = \mathbb{E}[(\hat{x}_n^{(j)} - \mathbb{E}(\hat{x}_n^{(j)}))^2].$$

To simplify the computation, it can be assumed that the mean of the synchronization error is null. This assumption may be considered as true asymptotically with many nodes and no propagation delay. In practice the mean is not null due to the propagation delays. In order to further improve the performance, it is proposed here that the weighting factor or weight is computed as the combination of one component depending on the synchronization performance (or synchronization quality) of the node (j) and one component depending on the dispersion in the propagation delay (or propagation medium quality) between the node (j) and (k):

$$\hat{x}_{n+1}^{(k)} = \hat{x}_n^{(k)} + \varepsilon^{(k)} + \sum_{j=1}^{M} \Omega_n^{(k,j)} \beta_n^{(j)} \Delta_n^{(k,j)}, \text{ where:}$$

$$\beta_n^{(k,j)} = \text{function}\left(\text{statistics}\{\hat{x}_n^{(j)}\}, \text{statistics}\{\tau^{(k,j)}\}\right).$$

The function f(.) above may be selected so as to minimize the synchronization error. Again, a statistic for integrating the impact of the propagation delay is the variance of the delay spread (RMS delay spread). However, other metrics reflecting the quality of the transmission may be suitable. In practice, each node may transmit a measure of its synchronization quality and the receiving node may compute the weighting factor $\beta_n^{(k,j)}$.

The application of a weighting factor or weight as per the present disclosure is meant to favor the "best" synchronized nodes in the computation of the consensus average. The purpose is to improve both the convergence speed and the steady state performance. From that respect, the weighting factor may be described as a function of a confidence value (or synchronization quality value) with respect to the synchronization node (j) as observed (taking the channel or propagation medium propagation quality into account) by node (k). This also enables to introduce a virtual hierarchy between the nodes in order to for example favor reference nodes such as base stations that possibly benefit from inherently good quality clocks.

In the following example, we show a specific implementation with weighting factors or weights derived from the update of the clock as an information filter. The information filter algorithm is itself a specific implementation of the Kalman filter (which applies linear quadratic estimation). The Kalman filter is an efficient recursive filter that estimates the internal, potentially hidden, state of a linear dynamic system from a series of noisy measurements. In the information filter, or inverse covariance filter, the estimated covariance and estimated state are replaced by the information matrix and information vector respectively. The starting point is that the synchronization problem may be described as the estimation of the hidden state of a system from noisy observations. A goal may be to estimate the ideal clock. To simplify the notations, we assume that the goal is here to estimate the synchronization error between the ego node's clock (also named specific synchronization reference) with respect to the ideal clock. Doing so, it is then possible to reconstruct the ideal clock by subtracting the synchronization error to the local clock (i.e. building the compensated clock). The objective is thus to estimate the hidden state of the system defined by:

$$x_{n+1}^{(k)} = x_n^{(k)} + \varepsilon^{(k)},$$

from the observations:

$$y_n^{(k)} = \begin{pmatrix} y_n^{(k,1)} \\ \vdots \\ y_n^{(k,N)} \end{pmatrix} = \begin{pmatrix} \Omega_n^{(k,1)}\left(x_n^{(1)} + \varepsilon^{(1)} - x_n^{(k)} - \varepsilon^{(k)} + \tau^{(1,k)}\right) \\ \vdots \\ \Omega_n^{(k,N)}\left(x_n^{(N)} + \varepsilon^{(N)} - x_n^{(k)} - \varepsilon^{(k)} + \tau^{(N,k)}\right) \end{pmatrix}.$$

Figure 8:
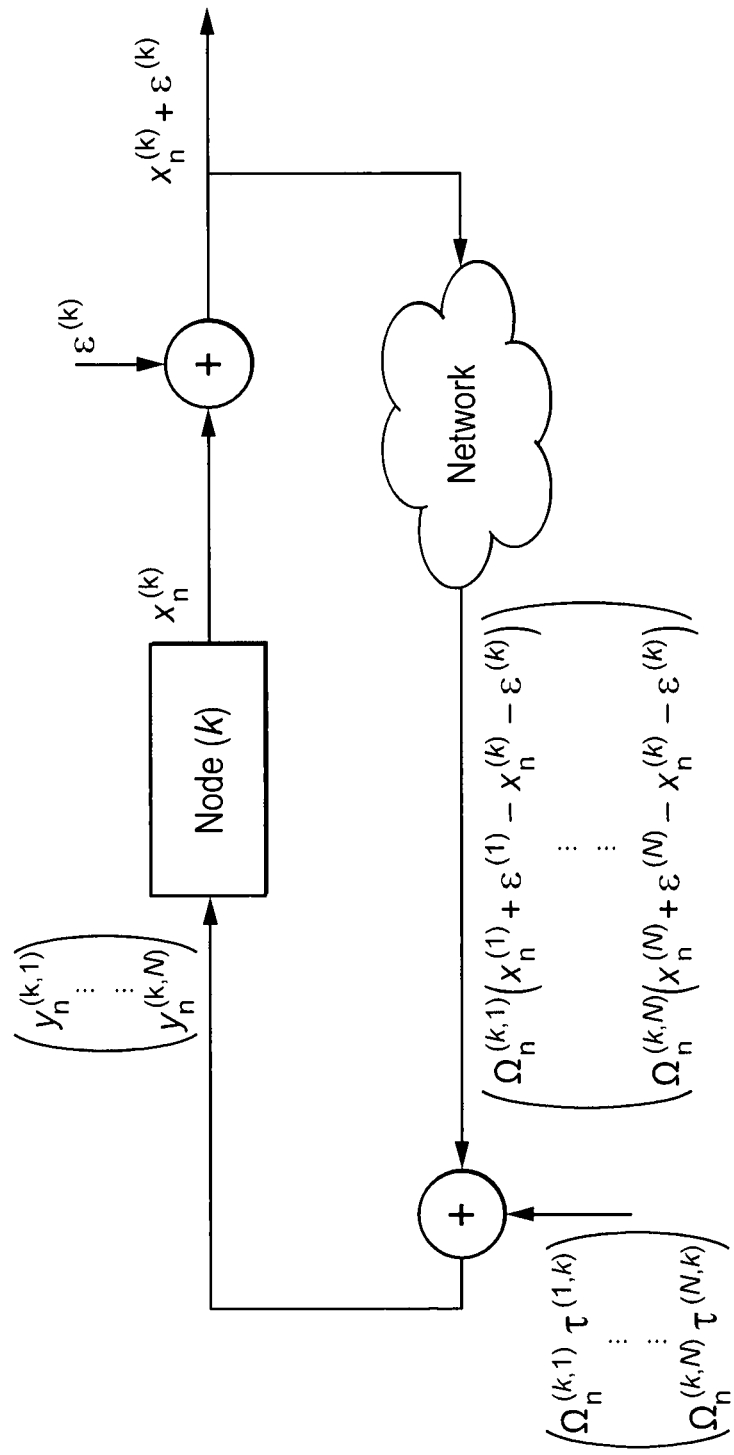
FIG. 8 illustrates a specific node to which a method is applied.

We consider, as input of the system (Node (k)), a vector containing the miss-synchronization values between the ego node, also named specific node, and its neighbors, also named other nodes, and as output, its miss-synchronization with respect to the ideal reference time (see FIG. 8).

After some rewriting, the state-space model can be expressed as follows:

$$\begin{cases} x_{n+1}^{(k)} = x_n^{(k)} + \varepsilon^{(k)} \\ y_n^{(k)} = \begin{pmatrix} y_n^{(k,1)} \\ \vdots \\ y_n^{(k,N)} \end{pmatrix} = \underbrace{\begin{pmatrix} -\Omega_n^{(k,1)} \\ \vdots \\ -\Omega_n^{(k,N)} \end{pmatrix}}_{H_n^{(k)}} \underbrace{\left(x_n^{(k)} + \varepsilon^{(k)}\right)}_{x_{n+1}^{(k)-}} + \underbrace{\begin{pmatrix} \Omega_n^{(k,1)}\left(x_n^{(1)} + \varepsilon^{(1)} + \tau^{(1,k)}\right) \\ \vdots \\ \Omega_n^{(k,N)}\left(x_n^{(N)} + \varepsilon^{(N)} + \tau^{(N,k)}\right) \end{pmatrix}}_{r_n^{(k)}} \end{cases}$$

This is consistent with a state-space representation used in Kalman or information filtering. Let's introduce the following notations:

$$\begin{cases} P_n^{(k)} = \text{var}\left[x_n^{(k)}\right] = \mathbb{E}\left[x_n^{(k)} x_n^{(k)}\right] \\ Q_n^{(k)} = \text{var}\left[\varepsilon_n^{(k)}\right] = \mathbb{E}\left[\varepsilon_n^{(k)} \varepsilon_n^{(k)}\right] = Q^{(k)} \\ P_n^{(k)-} = \text{var}\left[x_{n+1}^{(k)}\right] = \mathbb{E}\left[x_{n+1}^{(k)-} x_{n+1}^{(k)-}\right] = P_n^{(k)} + Q^{(k)} \\ R_n^{(k)} = \text{var}\left[r_n^{(k)}\right] \end{cases}$$

Note that in the previous equations, it is assumed that the mean of the synchronization error and the skew is null. The information filter maintains the estimates of the state:

$\hat{x}_{n|n}$ the estimate of $x_n$ given the observations $y_n$, $y_{n-1}, \ldots$ $\hat{x}_{n+1|n}$ the estimate of $x_{n+1}$ given the observations $y_n$, $y_{n-1}, \ldots$ and the inverse of the error covariance matrix of the state estimate:

$P_{n|n}^{-1}$ in the inverse covariance matrix of $x_n$ given the observations $y_n, y_{n-1}, \ldots$ $P_{n+1|n}^{-1}$ the inverse covariance matrix of $x_{n+1}$ given the observations $y_n, y_{n-1}, \ldots$ If all noises are zero-mean Gaussian white processes and if the system model is linear (which may be the case here), the Kalman/information filter may be an estimator in the sense that it minimizes the mean square error of the estimated parameters.

The information filter may be described as a two-step operation. In a first step, the estimator predicts the next state value from the previous ones. In a second step, the estimation is refined using the most recent and past observations. With our notations, the filtering is carried out according to the following equations:

Prediction step:

$$\begin{cases} \hat{x}_{n+1}^{(k)-} = \hat{x}_n^{(k)} + \varepsilon^{(k)} \\ P_{n+1}^{(k)-} = P_n^{(k)} + Q^{(k)} \end{cases}$$

The prediction corresponds to the transmitting mode when the node updates its clock with its own period. When the clock skew $\varepsilon_k$ and the propagation delays $\tau_n^{(j,k)}$ are assumed to be zero-mean Gaussian white noises (which implies that $r_n^{(k)}$ is also zero-mean Gaussian noise), the update equation can be written in the following form:

Update step:

$$\begin{cases} \left(P_{n+1}^{(k)}\right)^{-1} = \left(P_{n+1}^{(k)-}\right)^{-1} + H_n^{(k)T}\left(R_n^{(k)}\right)^{-1} H_n^{(k)} \\ \hat{x}_{n+1}^{(k)} = P_{n+1}^{(k)} \left(\left(P_{n+1}^{(k)-}\right)^{-1} \hat{x}_{n+1}^{(k)-} + H_n^{(k)T}\left(R_n^{(k)}\right)^{-1} y_n^{(k)}\right) \end{cases}$$

After some computations, we finally obtain EQ2:

$$\begin{cases} (P_{n+1}^{(k)})^{-1} = (P_n^{(k)} + Q^{(k)})^{-1} + \sum_{j=1}^{N} \Omega_n^{(k,j)} (P_n^{(j)} + Q^{(j)} + \text{var}[\tau^{(j,k)}])^{-1} \\ \hat{x}_{n+1}^{(k)} = (\hat{x}_n^{(k)} + \varepsilon^{(k)}) \\ -\sum_{j=1}^{N} \Omega_n^{(k,j)} \frac{P_{n+1}^{(k)}}{(P_n^{(j)} + Q^{(j)}) + \text{var}[\tau^{(j,k)}]} \left[ \begin{array}{c} (\hat{x}_n^{(k)} + \varepsilon^{(k)}) - (\hat{x}_n^{(j)} + \varepsilon^{(j)}) + \\ \tau^{(j,k)} \end{array} \right] \end{cases}$$

Whereby in the above expression, the terms $\text{var}[\tau^{(j,k)}]$ may be estimated from the channel estimates or by any other appropriate mean. It may be replaced by another term reflecting the quality of the propagation medium.

In the second equation of EQ2 the timing differences are weighted with a factor that increases when the variance of the error (including the propagation delay) decreases. This factor can be interpreted as a confidence value or synchronization quality value: Higher the confidence, stronger the weight of the corresponding node in the update of the synchronization is. It can be noticed that the confidence value is normalized according to the sum of all the confidences or sum of all the synchronization quality values, leading to a weighing effect relative to the overall confidence. The confidence value of the j-th node with respect to the ego node or specific node (k) equals to:

$$\frac{1}{(P_n^{(j)} + Q^{(j)}) + \text{var}[\tau^{(j,k)}]}$$

At each time step, the nodes confidences or synchronization quality values are updated or revised according to the first equation of EQ2. When the k-th node is in transmission mode (i. e. $\forall j$, $\Omega_n^{(k,j)}=0$), its confidence or synchronization quality value is decreasing due to the clock drift that introduces an additional uncertainty in the clock time estimation:

$$P_{n+1}^{(k)} = P_n^{(k)} + Q^{(k)} \Leftrightarrow \frac{1}{P_{n+1}^{(k)}} = \frac{1}{P_n^{(k)} + Q^{(k)}}.$$

The node thus directly transmits the term $P_n^{(k)}+Q^{(k)}$ avoiding the need for the receiver to have knowledge of $Q^{(k)}$. The value of the confidence value can e.g. be transmitted as a data component within the beacon. When in reception mode, the term $$\sum_{j=1}^{N} \frac{\Omega_n^{(k,j)}}{(P_n^{(j)} + Q^{(j)}) + \text{var}[\tau^{(j,k)}]}$$

is strictly positive (only if there is no transmitter in the k-th node neighborhood), and thus, it compensates for the clock drift uncertainty and improves the k-th node confidence level.

The second equation of EQ2 represents in this example the update rule for the clock timing estimation, or updating of the specific synchronization reference. The new clock timing depends on the previous system's state (clock timing), the internal error (clock drift) and the system's input which is the observed timing difference between the transmitters and the receiver $\Omega_n^{(k,j)}((x_n^{(k)}+\varepsilon^{(k)})-(x_n^{(j)}+\varepsilon^{(j)})+\tau^{(j,k)})$.

These inputs, or contributions, are weighted according to the methods of this disclosure. Therefore, information coming from reliable nodes have a more important contribution in the updated clock estimation of the receiver. The introduction of the propagation medium quality parameter $\text{var}[\tau^{(j,k)}]$ modifies the perceived confidences (or synchronization quality) of the neighboring transmitters. Therefore, information coming from a node that is close to the receiver may be more reliable than those sent by far base stations which are supposed to be more accurate.

It can be noticed that there is no need in this example to apply and update empirically a global weighting factor ($\xi$) in order to ensure the convergence of the algorithm. In the present example, the convergence takes place by construction.

The following examples focus on the using of rules according for example to method 200.

In some examples, it is assumed that each node transmits a beacon over each synchronization round with a probability of ½. One may compute an update rule of this probability in order to improve the synchronization performance. More generally, the transmitting probability may be computed so as to improve the system performance both in terms of synchronization and network metrics. In some examples, this approach is illustrated for controlling the transmitting probability in order to improve the synchronization performance. A goal may be here to find an improved tradeoff between a transmit and receive mode (in a case where the system is a half duplex system) to obtain an improved performance. A solution consists in computing the probability so as to minimize the covariance probability of the information filter, i.e.:

$$\underset{p_n}{\operatorname{argmin}} \, \mathbb{E}[\|P_{n+1}\|] \approx \underset{p_n}{\operatorname{argmax}} \, \mathbb{E}[\|P_{n+1}^{-1}\|]$$

Using the notations introduced above, we have:

$$\Omega_n^{(k,j)}=a_n^{(k,j)}(1-h_n^{(k)})h_n^{(j)},$$

$$\Omega_n = A \odot (1-h_n)h_n^T,$$

and finally:

$$\mathbb{E}[\Omega_n] = A \odot (1 - p_n)p_n^T, \text{ where}$$

$$P_n = \begin{pmatrix} P_n^{(1)} \\ \vdots \\ P_n^{(N)} \end{pmatrix}, P_n^{-1} = \begin{pmatrix} P_n^{(1)^{-1}} \\ \vdots \\ P_n^{(N)^{-1}} \end{pmatrix}, Q = \begin{pmatrix} Q^{(1)} \\ \vdots \\ Q^{(N)} \end{pmatrix}, p_n = \begin{pmatrix} p_n^{(1)} \\ \vdots \\ p_n^{(N)} \end{pmatrix},$$

$$h_n = \begin{pmatrix} h_n^{(1)} \\ \vdots \\ h_n^{(N)} \end{pmatrix}.$$

Assuming a statistical independence between $\mathbb{E}[\Omega_n]$ and $(P_n+Q)^{-1}$, the minimization problem may be expressed as:

$$\underset{p_n}{\operatorname{argmax}} \, \mathbb{E}[\|P_{n+1}^{-1}\|] \approx$$

$$\underset{p_n}{\operatorname{argmax}} \, \mathbb{E}[\|(P_n + Q)^{-1}\|] + A \odot (1 - p_n)p_n^T \mathbb{E}[\|(P_n + Q)^{-1}\|]$$

The transmission probability may be updated iteratively according to the approached equation:

$$p_{n+1}^{(k)} = p_n^{(k)} + \alpha_n^{(k)} \sum_{j=1}^{N} \Omega_n^{(k,j)} \left( \frac{1}{(P_n^{(k)} + Q^{(k)})} - \frac{1}{(P_n^{(j)} + Q^{(j)})} \right)$$

where $p_n^{(k)}$ represents the expectation of the transmission probability of the k-th node at the n-th step and $\alpha_n^{(k)}$ is a scaling parameter essentially meant to take into account the variations in the number of active nodes.

The probability of being in transmission mode is represented by the parameter $p_n^{(k)}$. This parameter is initialized at ½, then is updated at each reception step. We compare the node's confidence to the average of its neighbors' confidences: If the node's clock timing is more reliable than those of its neighbors, or has a better synchronization quality value than other nodes, it increases its transmission probability. Otherwise, $p_n^{(k)}$ decreases. One may also propose that a node (except base stations or reference nodes) may not be in transmitting mode in two successive steps. This example transmission probability update rule allows the reliable nodes (compared to their neighbors or other nodes) to transmit more often than the other nodes. For example, a node close to a base station has less chances to transmit. This may reduce the number of transmitted messages without degrading the system's performance because its neighbors are covered by the base station. It is to be noted that the update of the transmission probability may be turned into an update of the transmission period T. For example, the transmission period may be defined as a multiple of the original period where the multiplication factor is computed to satisfy the updated transmission probability.

The criterion or rule for controlling the transmission probability or frequency may be modified to take into account system-dependent constraints such as a maximum channel or medium occupancy target. In an aim of reducing a channel or medium occupancy, the transmission probabilities expectations may be explicitly introduced in the objective function of an optimization problem.

In an example, a QP (Quadratic Programming) optimization problem is proposed where the objective function is quadratic in terms of both the transmission probabilities expectations $p_n$ and the estimation errors variances $P_n$.

$$\operatorname{argmax}_{p_n} p_n^T \Gamma_1^{-1} p_n + \mathbb{E}[P_n^T] \Gamma_2^{-1} \mathbb{E}[P_n] =$$

$$\operatorname{argmin}_{p_n} \sum_{i=1}^{N} p_n^{(i)} \gamma_1^{-1} p_n^{(i)} + \mathbb{E}[P_n^{(i)}] \gamma_2^{-1} \mathbb{E}[P_n^{(i)}], \text{ where}$$

$$P_n = \begin{pmatrix} P_n^{(1)} \\ \vdots \\ P_n^{(N)} \end{pmatrix}, \, p_n = \begin{pmatrix} p_n^{(1)} \\ \vdots \\ p_n^{(N)} \end{pmatrix}, \, \Gamma_1 = \begin{pmatrix} \gamma_1 & & \\ & \ddots & \\ & & \gamma_1 \end{pmatrix}, \, \Gamma_2 = \begin{pmatrix} \gamma_2 & & \\ & \ddots & \\ & & \gamma_2 \end{pmatrix}$$

The matrices $\Gamma_1$ and $\Gamma_2$ are two symmetric positive-definite diagonal matrices and represent the weights of $p_n$ and $P_n$ respectively in the objective function. The ratio $\gamma_1/\gamma_2$ represents the trade-off between the synchronization accuracy and the channel or medium occupancy. Note that $\mathbb{E}[P_n^{(i)}]$ depends on $p_n^{(i)}$ which should be taken into account when tuning the matrices coefficients.

In this example, all nodes have the same weights. However, the weights may be different from a node to another. For example, the weight associated to the confidence level of the i-th node $\gamma_2^{(i)}$ may be chosen depending the synchronization accuracy level in function of the application used by the i-th node. One may also introduce non-diagonal terms in $\Gamma_1$ and $\Gamma_2$ to create dependencies between the nodes' transmission probabilities or confidence levels. For example, if two nodes i and j are very close, only one of them may be allowed to transmit. This constraint can be introduced by choosing a high value for $y_1^{(i,j)}$.

A trade-off between the transmission probabilities expectations and the synchronization accuracy levels is explicitly defined in the following formulation:

$$\operatorname{argmax}_{p_n} p_n^T \Gamma^{-\frac{1}{2}} \begin{pmatrix} \mathbb{E}[P_n^{(1)}] & & \\ & \ddots & \\ & & \mathbb{E}[P_n^{(N)}] \end{pmatrix} \Gamma^{-\frac{1}{2}} p_n = \operatorname{argmin}_{p_n} \sum_{i=1}^{N} p_n^{(i)} \frac{\mathbb{E}[P_n^{(1)}]}{\gamma} p_n^{(i)},$$

$$\text{where } \Gamma = \begin{pmatrix} \gamma & & \\ & \ddots & \\ & & \gamma \end{pmatrix}.$$

Under this formulation, nodes with high synchronized clocks may transmit more than less accurate nodes. If the $P_n^{(i)}$ is high, then $p_n^{(i)}$ should be low to reduce the value of $$p_n^{(i)} \frac{\mathbb{E}[P_n^{(i)}]}{\gamma} p_n^{(i)}$$

in the objective function. However, if $P_n^{(i)}$ is low, high values are allowed for $p_n^{(i)}$. When the matrices used in the problem formulation are positive-definite, the problem is a special case of a convex optimization problem.

Figure 9:
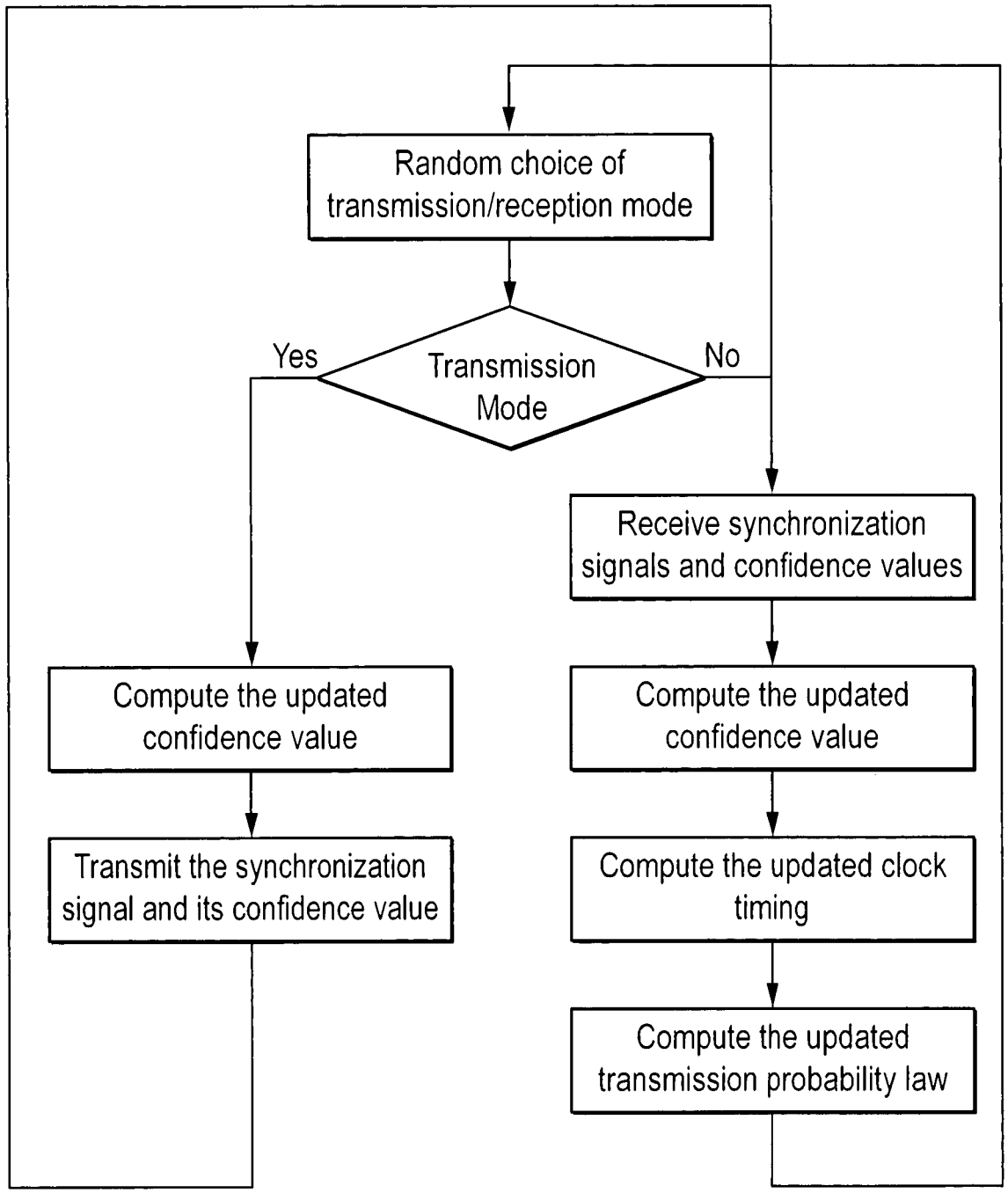
FIG. 9 illustrates another flow chart of a method.

In an example, as illustrated in FIG. 9 let us suppose that every node has an estimation of $Q^{(k)}$ related to the quality of its hardware.

Initialization: $P_n^{(k)} = (20 \, \mu s)^2$, $p_n^{(k)} = 0.5$.

At each time step, every node applies the following:

Assuming that each node knows the covariance of its estimation error, the covariance of its clock drift, which depends on its hardware quality, and its transmission/reception indicator probability.

At the k-th node:
1—The node chooses randomly to be in transmitting or in receiving mode according to its transmission probability law $h_n^{(k)} \sim \mathcal{B}(p_n^{(k)})$
2—If in transmission mode:
  a—The node updates its confidence value to take into account the clock drift effect (corresponding to revising its specific synchronization quality value)
  b—The node transmits the synchronization sequence and its new confidence value (also named revised synchronization quality value)
  c—The node chooses to be in reception mode in the next step
3—If in reception mode:
  a—The node receives synchronization signals and confidence values (also named respective synchronization quality values) from its neighbors (also named transmitting other nodes)
  b—The node updates its confidence value (corresponding to revising its specific synchronization quality value)
  c—The node updates its clock timing (corresponding to updating its specific synchronization reference)

d—The node updates its transmission probability law (corresponding to changing a rule to determine frequencies at which the specific node proceeds with the receiving and emitting).

The invention claimed is:

1. A method for synchronizing a specific node connected to a plurality of other nodes, the method comprising:
   a. receiving, at the specific node and from at least one transmitting other node, a respective synchronization quality value for the at least one transmitting other node, the respective synchronization quality value being a function of a respective synchronization characteristic of the at least one transmitting other node;
   b. measuring, by the specific node and for the at least one transmitting other node, a respective propagation medium quality value with the at least one transmitting other node; the respective propagation medium quality value being a function of a respective propagation characteristic between the specific node and the at least one transmitting other node;
   c. updating, by the specific node, a specific synchronization reference of the specific node, whereby the updating comprises, for each of the at least one transmitting other node, assigning to a respective contribution of the transmitting other node a respective weight of the transmitting other node, the respective weight being a function of the respective synchronization quality value of the transmitting other node and of the respective propagation medium quality value with the transmitting other node, the respective contribution of the transmitting other node comprising a respective synchronization variable of the transmitting other node;
   d. revising, by the specific node, a specific synchronization quality value being a function of the respective synchronization quality value of the at least one transmitting other node and of the respective propagation medium quality value with the at least one transmitting other node; and
   e. emitting, by the specific node, to a receiving other node, the revised specific synchronization quality value.

2. The method according to claim 1, whereby the method further comprises:
   f. using a rule to determine relative frequencies at which or order in which the specific node proceeds with the receiving, measuring, updating, revising and emitting.

3. The method according to claim 1, whereby the emitting takes place at a specific emitting power, the specific emitting power being determined in function of the specific synchronization quality value or in function of the revised specific synchronization quality value.

4. The method according to claim 1, whereby the respective synchronization characteristic is a respective synchronization statistic.

5. The method according to claim 1, whereby the respective synchronization characteristic is a variance of a synchronization error.

6. The method according to claim 1, whereby the respective propagation characteristic is a respective propagation delay statistic.

7. The method according to claim 1, whereby the synchronization is a temporal synchronization, the specific synchronization reference being a clock.

8. The method according to claim 1, whereby the method is operating with a plurality of transmitting other nodes, each transmitting other node corresponding to a respective synchronization quality value, a respective synchronization characteristic, a respective propagation medium quality value, a respective propagation characteristic, a respective contribution, a respective weight and a respective miss synchronization variable.

9. The method according to claim 1, whereby the updating comprises using Kalman filtering.

10. The method according to claim 1, whereby the method is operating with a plurality of receiving other nodes.

11. A specific node connected to a plurality of other nodes, the specific node comprising a processor adapted to perform according to claim 1.

12. The specific node according to claim 11, whereby the specific node is a mobile specific node.

13. The specific node according to claim 11, whereby the at least one transmitting other node is a mobile transmitting other node.

14. A network comprising a plurality of specific nodes, at least some of the specific node being according to claim 11.

15. A non-transitory computer readable storage medium comprising instructions which, when executed by a processor, cause the processor to perform according to claim 1.

* * * * *